(12) United States Patent
Sun

(10) Patent No.: US 7,595,994 B1
(45) Date of Patent: Sep. 29, 2009

(54) HEAT DISSIPATION DEVICE FOR EXPANSION CARD AND BRACKET THEREOF

(75) Inventor: Zheng-Heng Sun, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/110,292

(22) Filed: Apr. 26, 2008

(30) Foreign Application Priority Data

Apr. 3, 2008 (CN) .................. 2008 1 0300830

(51) Int. Cl.
*H05K 7/20* (2006.01)
*G06F 1/16* (2006.01)

(52) U.S. Cl. ............... 361/721; 361/679.4; 361/679.48; 361/695; 361/807; 361/810; 361/825; 248/247; 248/248; 248/300

(58) Field of Classification Search ................................ 361/679.31–679.32, 679.4, 679.46, 679.48, 361/694–695, 716, 720–721, 792, 804, 807, 361/809–810, 825; 248/247–248, 300; 211/41.17
See application file for complete search history.

(56) References Cited

U.S. PATENT DOCUMENTS

| | | | | |
|---|---|---|---|---|
| 1,491,678 A | * | 4/1924 | Dabney | .................. 248/208 |
| 1,558,977 A | * | 10/1925 | Gray | .................. 248/208 |
| 1,914,617 A | * | 6/1933 | Rogers | .................. 248/208 |
| 3,289,994 A | * | 12/1966 | Burmeister | .......... 248/220.41 |
| 3,730,472 A | * | 5/1973 | Dale | .................. 248/300 |
| 4,327,888 A | * | 5/1982 | Scheneman | .......... 248/220.43 |
| 5,822,188 A | * | 10/1998 | Bullington | .............. 361/695 |
| 6,330,156 B1 | * | 12/2001 | Cresse | ................ 361/695 |
| 6,411,511 B1 | * | 6/2002 | Chen | .................. 361/697 |
| 6,618,260 B2 | * | 9/2003 | Willis et al. | ............. 361/752 |
| 6,894,895 B2 | * | 5/2005 | Willis et al. | .......... 361/679.32 |
| 2004/0084388 A1 | * | 5/2004 | Roesner et al. | ......... 211/41.17 |

* cited by examiner

*Primary Examiner*—Jayprakash N Gandhi
*Assistant Examiner*—Robert Hoffberg
(74) *Attorney, Agent, or Firm*—Frank R. Niranjan

(57) ABSTRACT

The invention relates to a heat dissipation device with a bracket for dissipating heat of a heating element of an expansion card. The heat dissipation device also includes an auxiliary card, a heat dissipating element. The bracket includes a securing element configured for securing the heat dissipating element thereto, a locking element, and a connecting element connecting the securing element to the locking element. The securing element clamps the expansion card, and the locking element is slidably mounted to the auxiliary card, to align the heat dissipating element with the heating element of the expansion card.

6 Claims, 4 Drawing Sheets

HEAT DISSIPATION DEVICE FOR EXPANSION CARD AND BRACKET THEREOF

BACKGROUND

1. Field of the Invention

The present invention relates to heat dissipation devices, and particularly to a heat dissipation device for an expansion card and a bracket thereof.

2. Description of Related Art

Nowadays, peripheral component interconnect (PCI) expansion cards are widely used in motherboards of computers, such as sound cards, graphic cards etc. During operation, these expansion cards may produce heat that needs to be dissipated. A conventional method for dissipating the heat is to use heat-dissipating elements, such as fans, that are mounted to the heating elements of the expansion cards. However, these heat-dissipating elements may not be able to fully and effectively dissipate the heat.

What is needed is to provide a heat dissipation device which effectively dissipates heat for an expansion card.

SUMMARY

An embodiment of a heat dissipation device for dissipating heat of a heating element of an expansion card includes an auxiliary card, a heat dissipating element, and a bracket. The bracket includes a securing element configured for securing the heat dissipating element thereto, a locking element, and a connecting element connecting the securing element to the locking element. The securing element is secured to the expansion card. The locking element is slidably mounted to the auxiliary card, thereby aligning the heat dissipating element with the heating element of the expansion card.

Other advantages and novel features of the present invention will become more apparent from the following detailed description of an embodiment when taken in conjunction with the accompanying drawings, in which:

DETAILED DESCRIPTION

Figure 1:
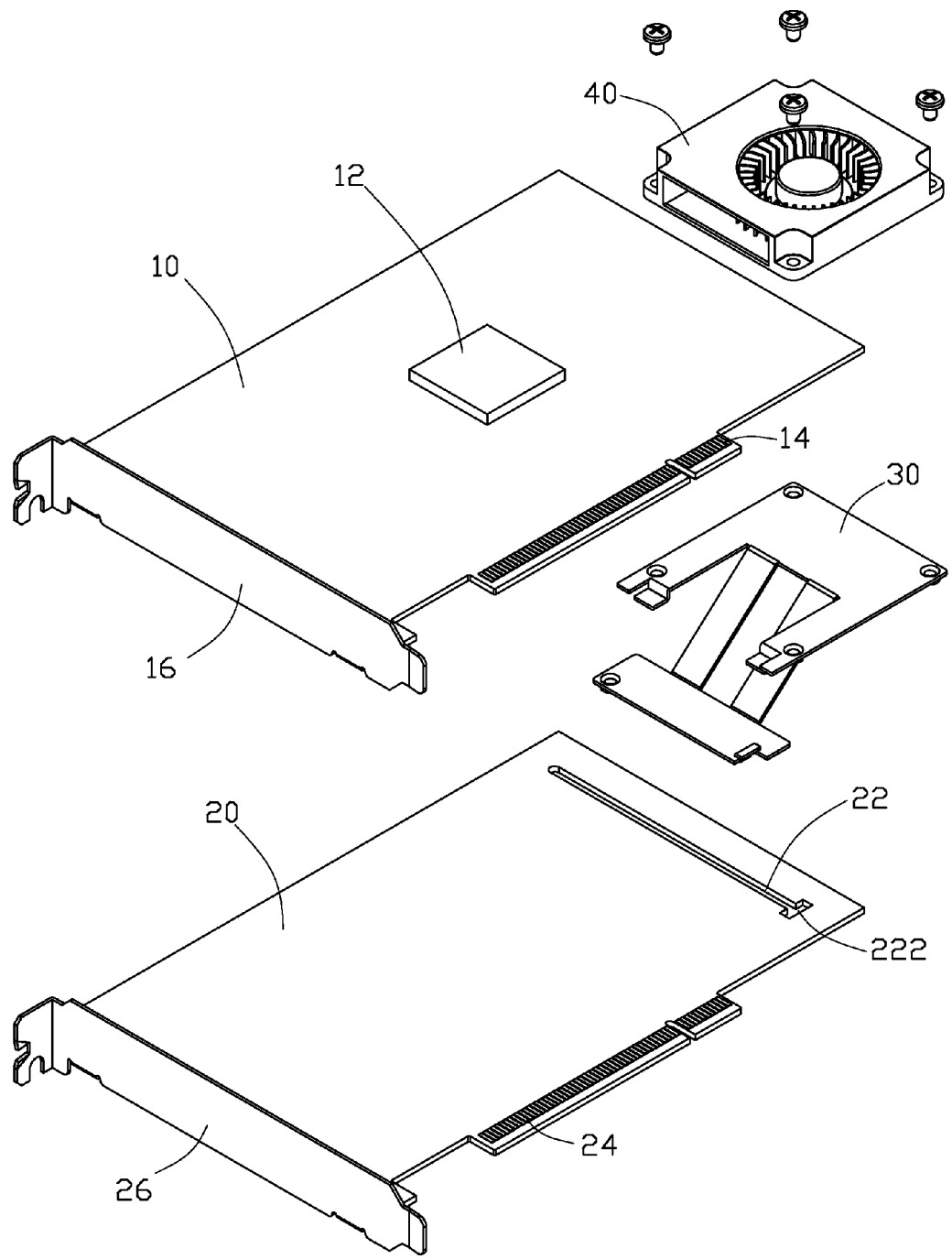
FIG. 1 is an exploded, isometric view of a heat dissipation device in accordance with an embodiment of the present invention, together with an expansion card.
Figure 2:
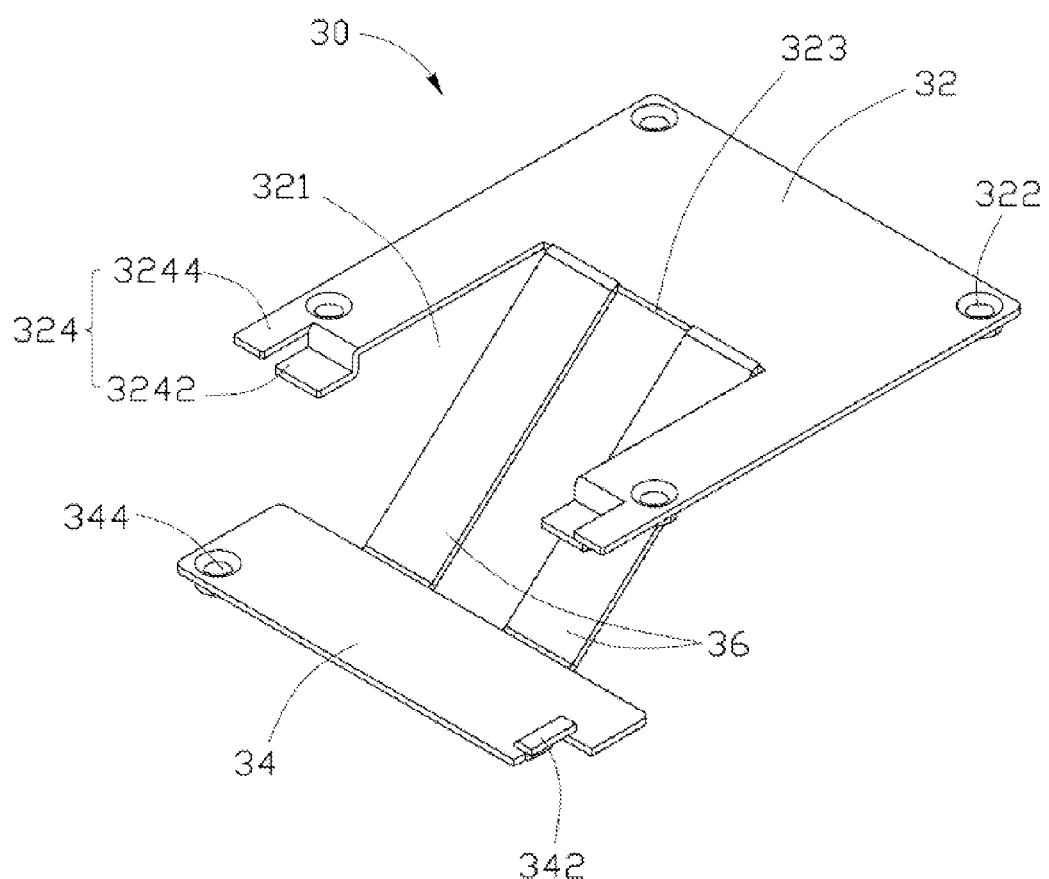
FIG. 2 is an isometric view of a bracket of the heat dissipation device of FIG. 1

Referring to the FIGS. 1 and 2, a heat dissipation device in accordance with an embodiment of the present invention is configured for dissipating heat for a heating element 12 of an expansion card 10. The heat dissipation device includes an auxiliary card 20, a bracket 30, and a heat dissipating element such as a blower 40. In this embodiment, the expansion card 10 and the auxiliary card 20 are PCI expansion cards.

The expansion card 10 includes a gold finger 14 configured for being plugged into a first PCI slot of a motherboard (not shown), and a blocking piece 16 at an end thereof configured for positioning the expansion card 10 to a computer enclosure (not shown). The auxiliary card 20 includes a gold finger 24 configured for being plugged into a second PCI slot adjacent the first PCI slot of the motherboard, and a blocking piece 26 at an end thereof configured for positioning the auxiliary card 20 to the computer enclosure. A guide groove 22 is defined in an end opposite to the blocking piece 26 of the auxiliary card 20. A guide hole 222 is formed at an end of the guide groove 22.

Referring also to FIG. 2, the bracket 30 includes a securing element 32 configured for securing the blower 40 thereto, a locking element 34, and a connecting element, such as two parallel connecting plates 36, connecting the securing element 32 to the locking element 34.

The securing element 32 is comparatively square-shaped and defines an opening 321 therein. Four screw holes 322 are respectively defined in four corners of the securing element 32 for securing the blower 40. Two clamp portions 324 are respectively protruding from a side of the securing element 32 and at opposite sides of the opening 321. Each clamp portion 324 includes an L-shaped bent portion 3242 first perpendicularly extending down then horizontally extending from the securing element 32 and neighboring the opening 321 of the securing element 32, and an arm 3244 horizontally extending from the securing element and opposite to the opening 321. The two clamp portions 324 are configured to clamp an end opposite to the blocking piece 16 of the expansion card 10.

The locking element 34 is comparatively rectangular-shaped and parallel to the securing element 32. A long side of the locking element 34 is connected to a rim 323 of the opening 321 of the securing element 32 via the connecting plates 36. A vertical distance between the securing element 32 and the locking element 34 is equal to a distance between the first and second PCI slots of the motherboard. A guide rail 342 parallel to the locking element 34 is formed from an end of the locking element 34 corresponding to the guide hole 222 and the guide groove 22 of the auxiliary card 20. A through hole 344 is defined in the other end of the locking element 34. In other embodiments, the securing element 32, the locking element 34, and the connecting plates 36 can be designed in other modes, which can be connected to the expansion card 10 and the auxiliary card 20.

Figure 3:
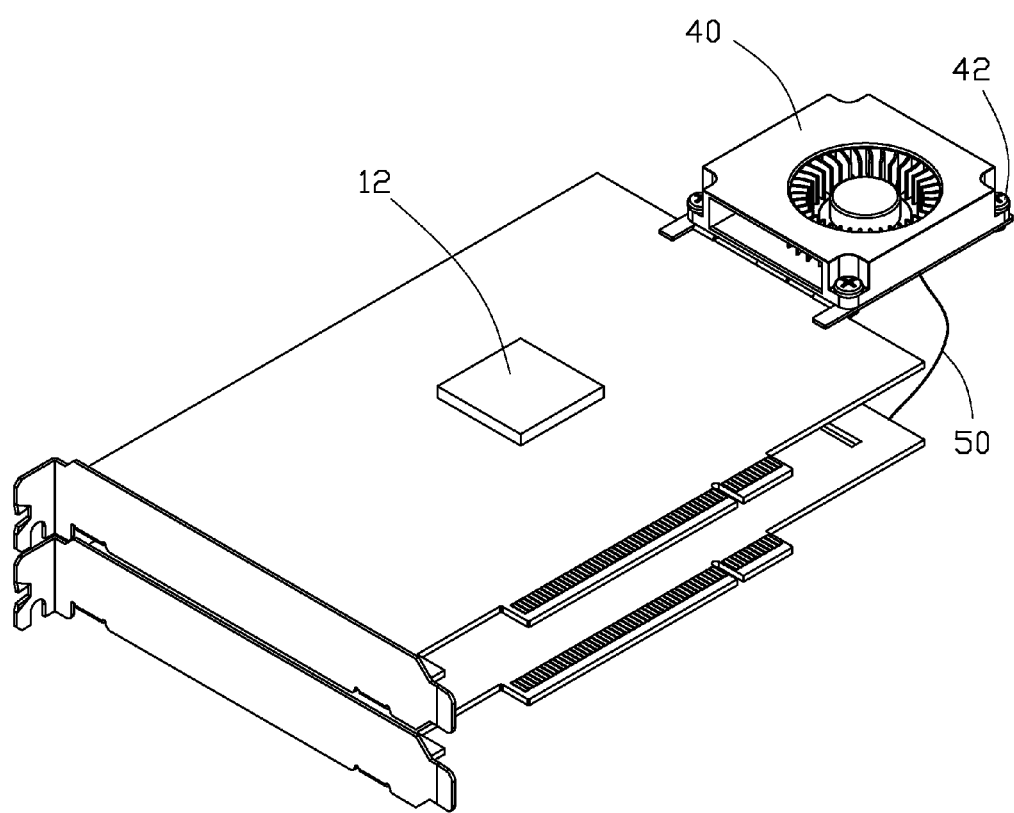
FIG. 3 is an assembled view of FIG. 1.
Figure 4:
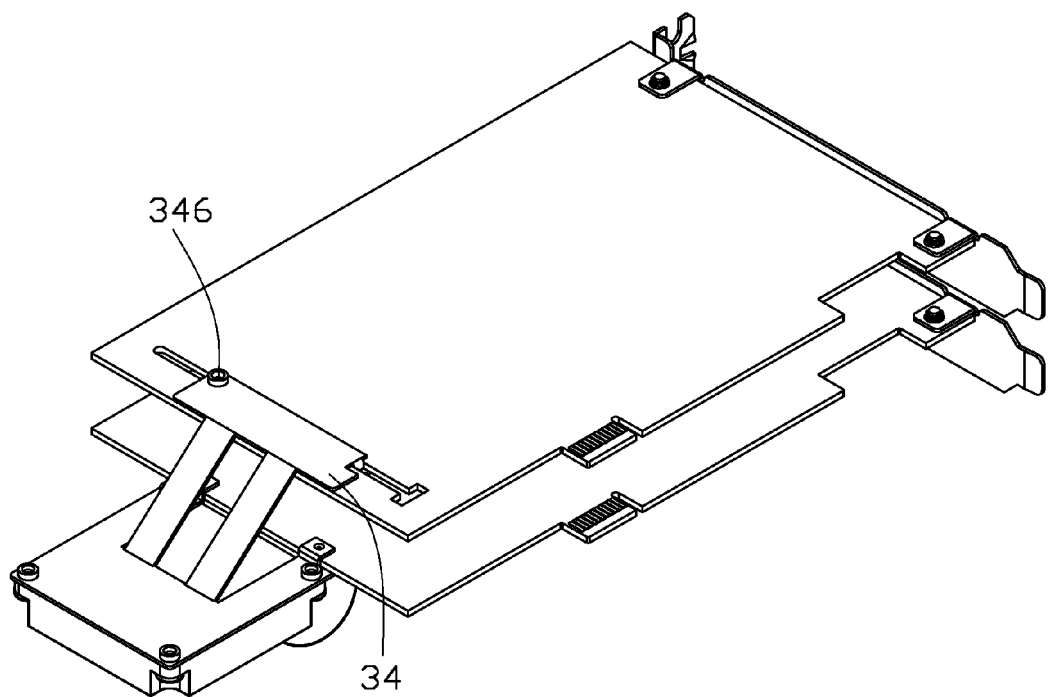
FIG. 4 is similar to FIG. 3, but an inverted view.

Referring also to FIGS. 3 and 4, in assembly, the blower 40 is mounted to the securing element 32 via four screws 42 extending therethrough and respectively engaging in the screw holes 322 of the securing element 32 of the bracket 30. The guide rail 342 of the locking element 34 is passed through the guide hole 222 of the auxiliary card 20 and can slide in the guide groove 22 of the auxiliary card 20. The clamp portions 324 clamp the end opposite to the blocking piece 16 of the expansion card 10. Thus, the bracket 30 is slidably mounted to the expansion card 10 and the auxiliary card 20, thereby aligning the blower 40 with the heating element 12 of the expansion card 10. A bolt (not shown) is extended through the through hole 344 of the locking element 34 of the bracket 30 to be engaged with a nut 346, thereby securing the bracket 30 to the expansion card 10 and the auxiliary card 20.

In this embodiment, power to the blower 40 is supplied by the gold finger 24 of the auxiliary card 20, namely a power line 50 is connected between power pins of the blower 40 and power pins of the gold finger 24 of the auxiliary card 20. In other embodiments, the power pins of the blower 40 can be connected to other power pins of the motherboard.

After the bracket 30 is assembled to the expansion card 10 and the auxiliary card 20, the gold fingers 14, 24 of the expansion card 10 and the auxiliary card 20 are respectively plugged into the first and second PCI slots of the motherboard. When the motherboard is in use, the expansion card 10 will work. At this time, the blower 40 works to dissipate heat from the heating element 12 of the expansion card 10, which achieves a better effectiveness in dissipating the heat of the motherboard.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A heat dissipation device for dissipating heat of an expansion card, the heat dissipation device comprising:
   an auxiliary card;
   a heat dissipating element; and
   a bracket comprising a securing element, for securing the heat dissipating element thereto, a locking element, and a connecting element that connects the securing element to the locking element;
   wherein the securing element attaches to the expansion card, and the locking element is adjustably mounted to the auxiliary card and wherein a guide groove is defined in an end of the auxiliary card, a guide hole is formed at an end of the guide groove, and a guide rail is extended from an end of the locking element; wherein the guide rail is capable of being inserted into to the guide hole.

2. The heat dissipation device as claimed in claim 1, wherein the securing element defines an opening therein, the connecting element includes two parallel connecting plates, and a side of the locking element is connected to a rim of the opening via the connecting plates.

3. The heat dissipation device as claimed in claim 2, wherein two clamp portions protrude from a side of the securing element at opposite sides of the opening; wherein the clamp portions are capable of attaching to the expansion card.

4. The heat dissipation device as claimed in claim 3, wherein each of the clamp portions comprises an L-shaped portion, and an arm portion horizontally extending from the securing element on the opposite side of the L-shaped portion relative to the opening.

5. The heat dissipation device as claimed in claim 1, wherein the heat dissipating element is a blower.

6. The heat dissipation device as claimed in claim 1, wherein the expansion card and the auxiliary card are peripheral component interconnect (PCI) expansion cards.

* * * * *